United States Patent
Schifsky

[11] Patent Number: 6,068,432
[45] Date of Patent: May 30, 2000

[54] TRAILER CLAMP FOR SNOWMOBILE

[75] Inventor: Toby D. Schifsky, Minneapolis, Minn.

[73] Assignee: Schifsky Consulting Services, Inc., Minneapolis, Minn.

[21] Appl. No.: 09/095,288

[22] Filed: Jun. 10, 1998

[51] Int. Cl.[7] .................................................. B60P 7/08
[52] U.S. Cl. ................................................ 410/3; 410/7
[58] Field of Search .................................. 410/2, 3, 7, 9, 410/19, 77; 248/500, 503, 316.5; 224/42.4, 558, 917.5

[56] References Cited

U.S. PATENT DOCUMENTS

| | | | |
|---|---|---|---|
| 3,672,523 | 6/1972 | Albert | 410/3 X |
| 4,772,164 | 9/1988 | McFarland | 410/3 |
| 5,044,845 | 9/1991 | Baker, Jr. | 410/3 |
| 5,119,980 | 6/1992 | Grim et al. | 224/917.5 X |
| 5,203,655 | 4/1993 | Persau | 410/3 |
| 5,456,397 | 10/1995 | Pedrini | 224/917.5 X |
| 5,785,471 | 7/1998 | Godbersen | 410/3 |
| 5,816,757 | 10/1998 | Huston | 410/3 |

Primary Examiner—Stephen T. Gordon

[57] ABSTRACT

A clamp for fixing a snowmobile for transport safely in a trailer. The clamp includes a clamping member swingable between an open position and a closed position. In the open position, the clamping member is in an out of the way position to permit a snowmobile to drive in one direction onto the trailer for transport and, at the destination, to continue to drive in the same direction off the trailer. The free end of the swinging clamp includes a quick connect and release connection. Such connection includes an over center connection where the free end is swingably engaged to a base. Each end of the clamping member is adjustable towards and away from its respective interacting portion of the base to provide for skis of different structures. Further, such adjustment keeps the clamping member in an orientation which is generally the parallel to the plane in which the skis generally lie. A relatively hard but resilient piece is fixed on the underside of the clamping member to confront the ski. A portion of the base includes a guide and another portion of the base may include a track for the skag of a ski. The clamping member is biased towards the open position.

23 Claims, 8 Drawing Sheets

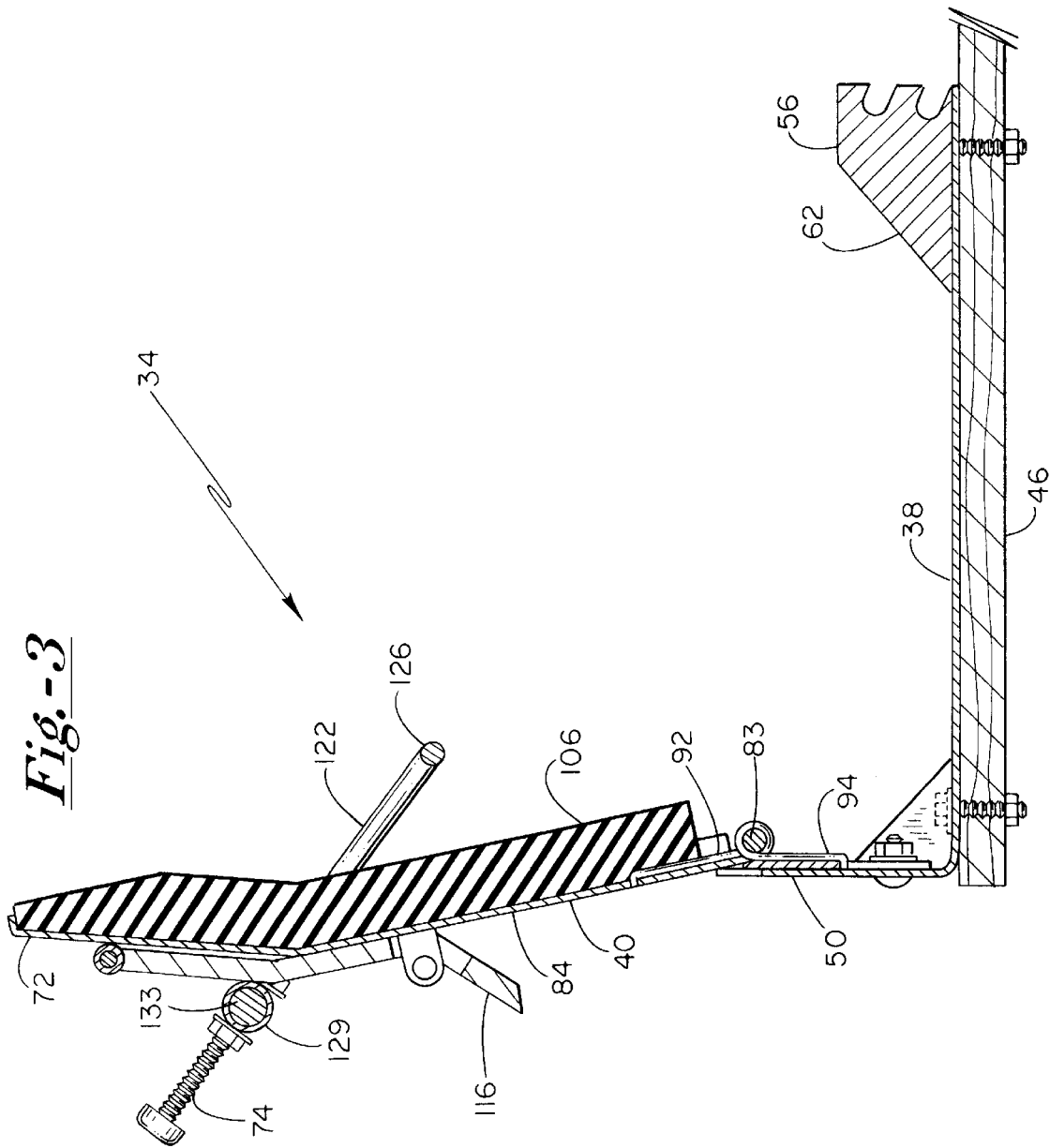

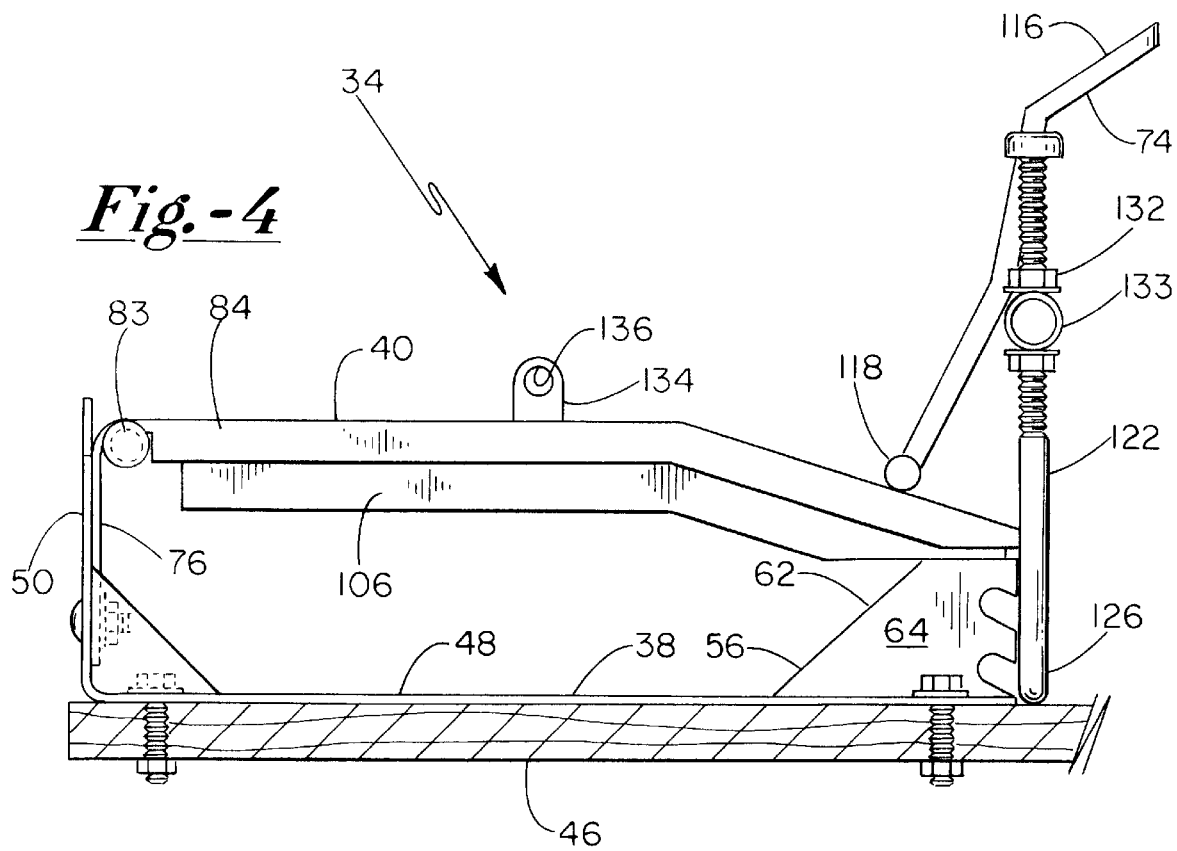

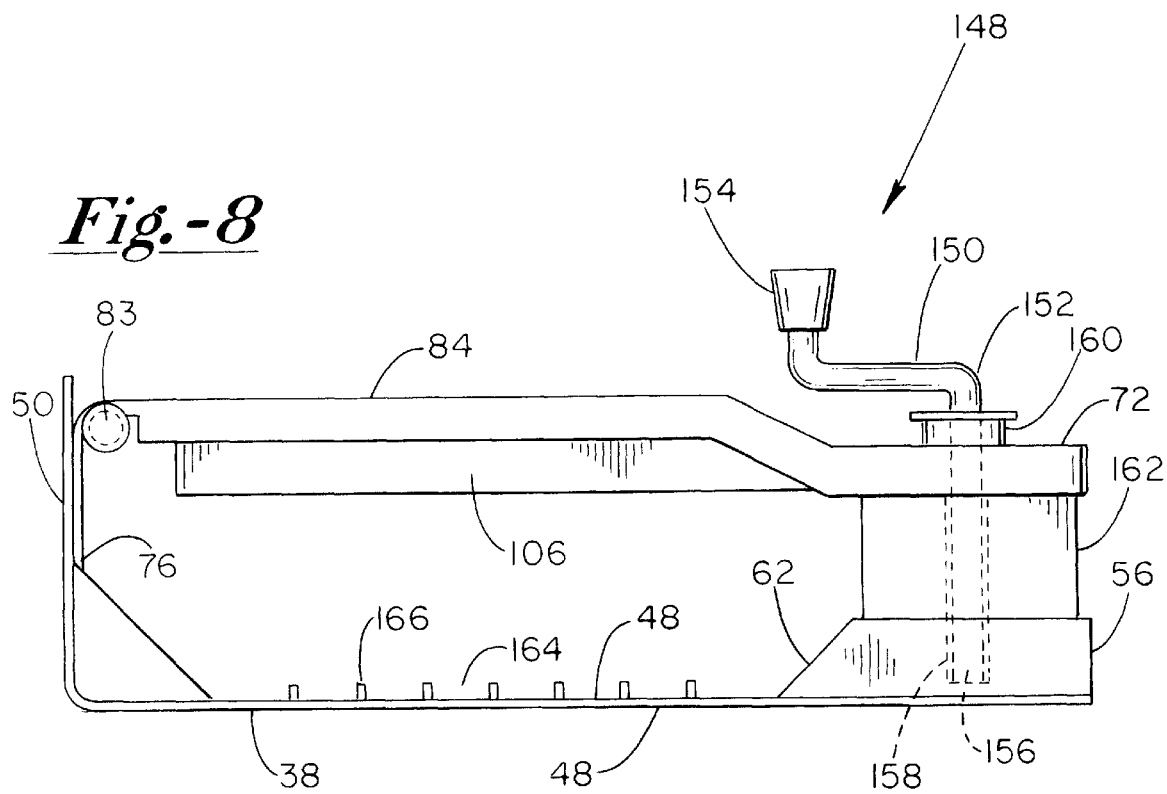

TRAILER CLAMP FOR SNOWMOBILE

FIELD OF THE INVENTION

This application relates generally to snowmobiles, particularly to trailer clamps for snowmobiles, and specifically to quick connect and release mechanisms for clamping one or more skis of a snowmobile to a trailer.

BACKGROUND OF INVENTION

Snowmobiles fall off trailers. For example, when the vehicle towing the trailer suddenly stops, the snowmobile may break free of the trailer and fly forwardly, perhaps over or into the vehicle towing it. When uncoupled from its trailer such as from routine bumps over a long trip, the snowmobile becomes a tumbling football like object on the highway for other vehicles to dodge though the direction of the next bounce is unknown. Unfortunately, unlike a football, the snowmobile is a massive machine with great inertia at high speeds.

SUMMARY OF THE INVENTION

A feature of the present invention is a clamp for clamping the ski of a snowmobile to the bed of a trailer.

Another feature of the present invention is a clamping member that is swingably engaged at one end to a first portion of a base and includes a clamping end at the other, second end to connect to another portion of the base to engage the snowmobile ski between the clamping member and the base.

Another feature of the present invention is the provision, between the clamping end and the second portion of the base, of an over the center connection mechanism to engage the clamping end to the second portion of the base and signal through touch to the user that the clamp is engaged.

Another feature of the present invention is the provision, between the clamping end and the second portion of the base, of a quick connect and release connection to maximize the chances that the clamp will be used.

Another feature of the present invention is the provision, between the clamping end and the second portion of the base, of a swinging connection to draw the clamping end tightly to the second portion of the base.

Another feature of the present invention is the provision, to the clamping member, of an out of the way open position to permit the snowmobile to drive up the trailer to the clamp in one direction and to drive off the trailer away from the clamp in the same direction.

Another feature of the present invention is the provision, between the first end of the clamping member and the first end of the base, of a fine adjustment mechanism to draw such ends towards and away from each other and to then fix such ends at any one of a plurality of positions to customize the clamp for a snowmobile ski of a certain structure.

Another feature of the present invention is the provision, between the second, clamping end of the clamping member and the second end of the base, of an incremental adjustment mechanism to incrementally adjust the distance between such ends to customize the clamp for a snowmobile ski of a certain structure.

Another feature of the present invention is the provision, between the second, clamping end of the clamping member and the second end of the base, of a quick adjustment mechanism to quickly adjust the relative distance between such ends to provide for tight and tighter engagements between such ends.

Another feature of the present invention is a clamping arm that includes first, second and third arm sections, with the first arm section being swingably engaged to a first portion of a base, with the second arm section being swingably engaged to the first arm section, with the third arm section being swingably engaged to the second arm section, and with the third arm section being swingably engagable to the second portion of the base.

Another feature of the present invention is the provision on the underside of the clamping member of a hard but resilient member to confront without damaging the snowmobile ski.

Another feature of the present invention is the provision, on the second portion of the base, of a block for engaging the second end of the clamping member and wherein the block includes a slanted side surface to guide the snowmobile ski back onto a main portion of the base.

Another feature of the present invention is the provision, on such block, of a slanted front surface to guide a snowmobile up and over the block instead of into the block.

Another feature of the present invention is the provision for a lock on the clamp to secure the snowmobile against theft.

An advantage of the present invention is safety. The clamp pinches the snowmobile ski tightly to the bed of the trailer so that the snowmobile stays on the trailer in the event of a sudden stop or collision or routine bumps. The clamp is easily, simply and quickly used; accordingly, the chances are maximized that the clamp will be used. The clamp lets the user know through touch when it is closed.

Another advantage of the present invention is that it permits a snowmobile to be driven up the trailer in one direction and off the trailer in the same direction. Features that provide for this advantage are the relatively small size of the clamp, its relatively low profile, and the swinging of the clamping member to the out of way position. Of course, if desired with the present invention, the snowmobile may be driven up to the clamp in the trailer in one direction, and then slid off the trailer in the opposite direction.

Another advantage of the present invention is cost. The present clamp is simple and inexpensive to manufacture and maintain.

Another advantage of the present invention is that pressure from the clamp is evenly distributed over the snowmobile ski. Many snowmobile skis have a pair of elongate extensions extending upwardly from their upper surface and running forwardly and rearwardly. The clamping member of the present invention traverses these forwardly and rearwardly running extensions and it is preferable that the clamp bites down with equal pressure, via the hard resilient piece, on each of these extensions. Such a preferably horizontal orientation of clamping member is provided for by a height adjustment mechanism on one side of the clamp and a height adjustment mechanism on the other side of the clamp.

Another advantage of the present invention is that, even if the snowmobile is driven into the trailer haphazardly and even if the clamping member is haphazardly used such that the clamping member bites down on only one such elongate extension, the clamp works and the snowmobile is secured.

Another advantage of the present invention is that the clamp may be made in different sizes. For example, the clamp may be made relatively small to fit over one snowmobile ski or made relatively large to fit over the two skis of a snowmobile.

These and further objects and advantages of the present invention will become clearer in light of the following detailed description of an illustrative embodiment of this invention described in connection with the drawings.

BRIEF DESCRIPTION OF THE DRAWINGS

FIG. 3 is a section view of the clamp of FIG. 2 in an open and out of the way position.

FIG. 4 is a front view of the clamp of FIG. 2 showing the clamp immediately before being closed without a ski therein or immediately after being opened.

FIG. 8 is a front view of an alternate embodiment of the present invention where the free end of the swinging member of the clamp is incrementally drawn towards its respective portion of the base.

All Figures are drawn for ease of explanation of the basic teachings of the present invention only; the extensions of the Figures with respect to number, position, relationship, and dimensions of the parts to form the preferred embodiment will be explained or will be within the skill of the art after the following description has been read and understood. Further, the exact dimensions and dimensional proportions to conform to specific force, weight, strength, and similar requirements will likewise be within the skill of the art after the following description has been read and understood. Where used in the various figures of the drawings, the same numerals designate the same or similar parts.

DETAILED DESCRIPTION

Figure 1:
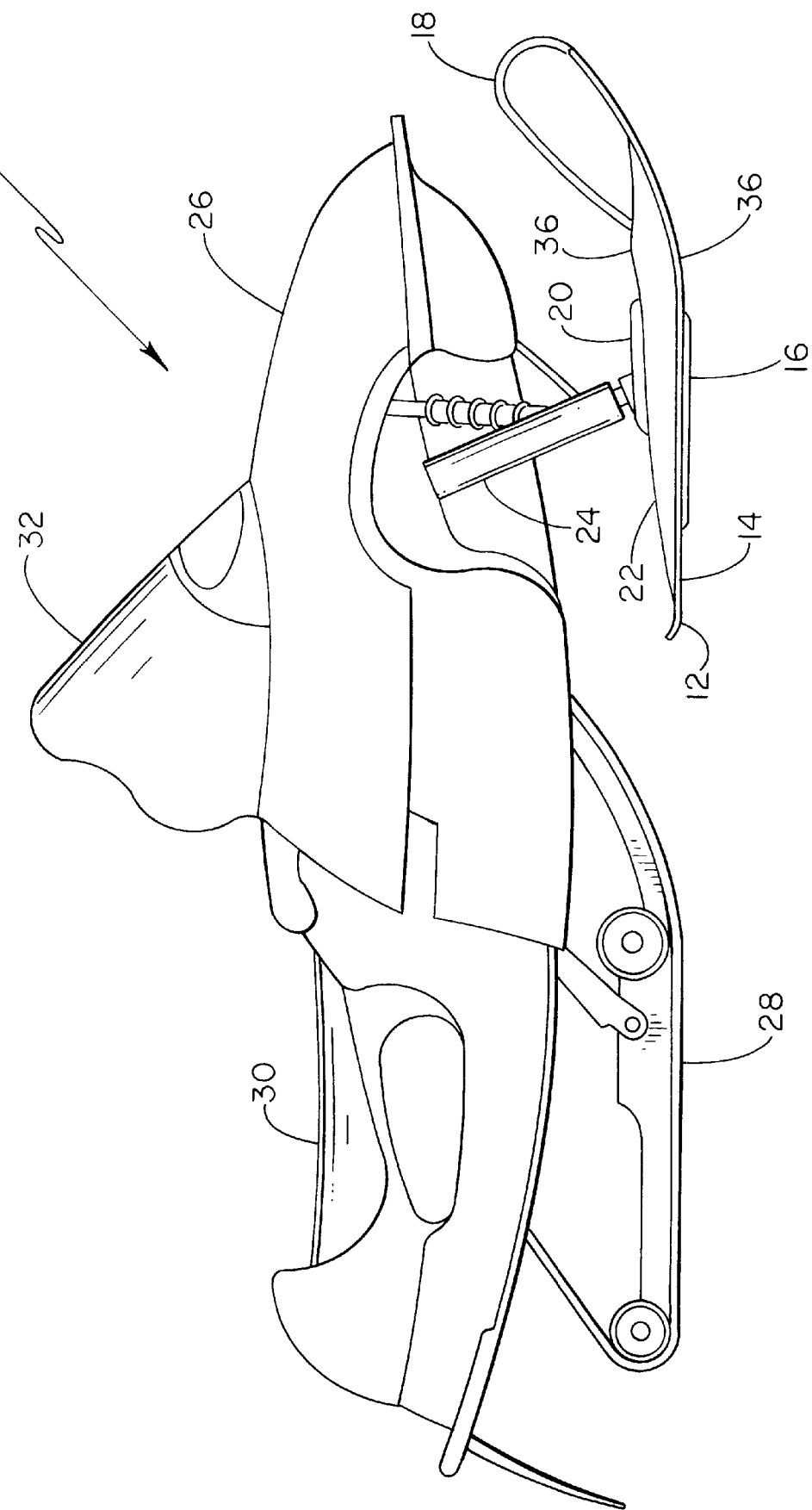
FIG. 1 is a right side view of a snowmobile and shows one of the skis for engagement by the clamp of the present invention.

As indicated in FIG. 1, a snowmobile 10 includes a pair of skis 12, one of which is shown in the side view of FIG. 1. Ski 12 includes a main body portion 14, a skag 16 on the underside of the main body portion 14, a hook 18, a strut connection 20, and a pair of forwardly and rearwardly extending ribs 22. The snowmobile 10 further includes shock absorbers 24 extending to skis 12, an engine compartment 26, a drive belt 28, a seat 30, and a windshield 32.

Figure 2:
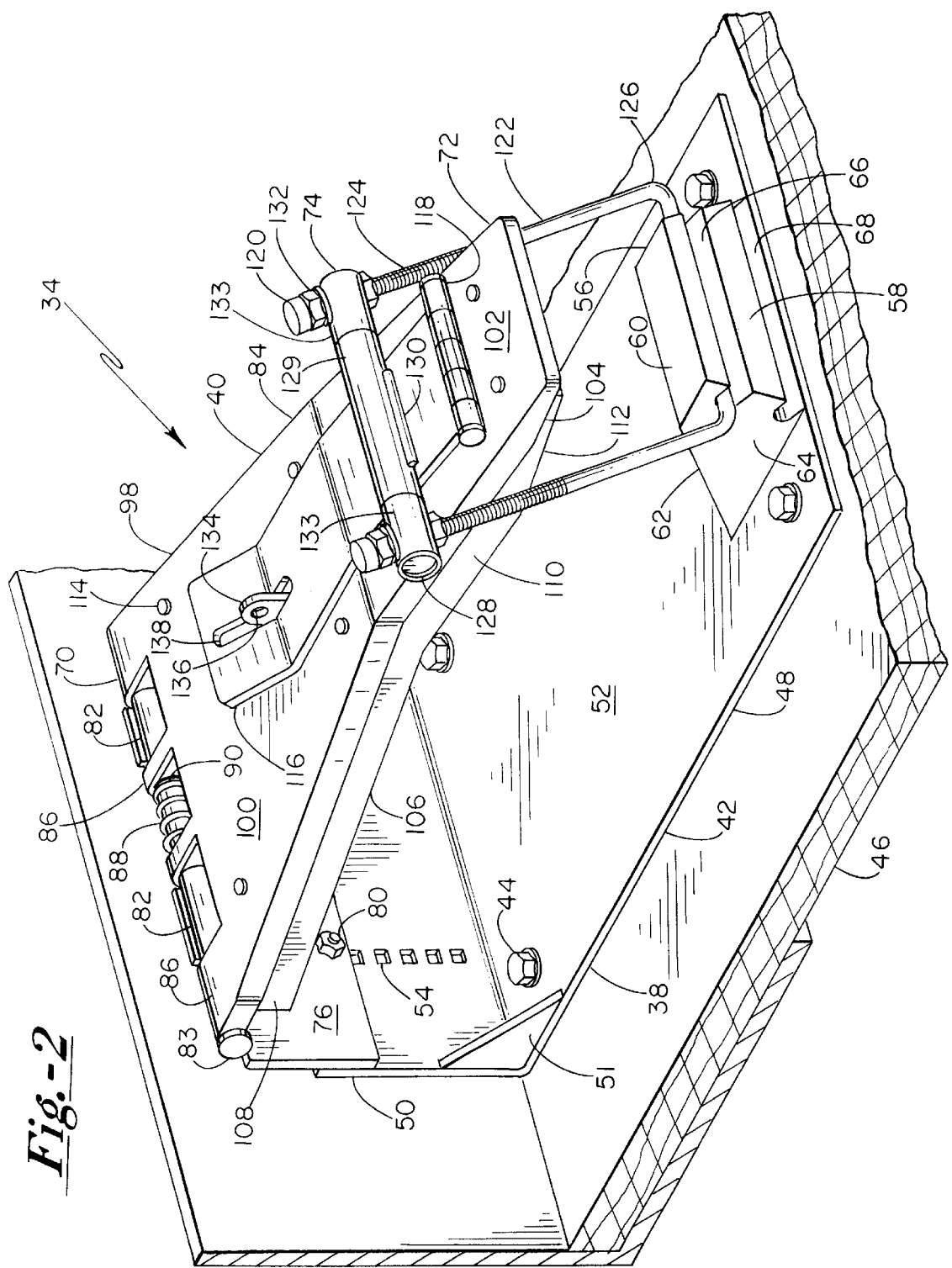
FIG. 2 is a is perspective view of the clamp of the present invention.

The clamp of the present invention is indicated by reference numeral 34 in FIG. 2. As shown in FIG. 1, clamp 34 is preferably fixed to the portion of ski 12 that is indicated by reference numeral 36. On the top side of ski 21, ski portion 36 is disposed between strut support 20 and hook 18 and traverses the ribs 22. On the underside of ski 12, ski portion 36 is disposed immediately forwardly of the tip of skag 16.

Clamp 34 generally includes a base 38 and a swinging or clamping member 40 that is swingable towards and away from the base 38.

More specifically, as shown in FIG. 2, base 38 includes an angle iron 42 bolted via pin connectors 44 to the bed 46 of a trailer. Angle iron 42 includes a base floor piece or track portion 48 integral with and at a right angle to a base side piece or wall portion 50. Support bracket 51 reinforces the integral connection between the base floor piece 48 and the base side piece 50. The upper oblique surface of the bracket may serve as a guide to push snowmobile ski 12 back into clamp 34. Base floor piece 48 includes an upper surface 52 against which the ski 12 slides. Base side piece 50 includes a plurality of apertures 54. Apertures 54 are arranged in two vertically extending columns. Each of the apertures 54 in each of the columns is matched on the horizontal with an aperture of the other column. Each aperture 54 is spaced equidistant from the aperture above and below it. As shown in FIG. 7B, base side piece 50 includes a pair of extensions 55. Apertures 54 extend up and into extensions 55.

Base 38 further includes a block 56 disposed opposite of base side piece 50. Block 56 includes an outer side surface 58, an upper surface 60, an inner side surface 62, and a front side surface 64. Surface 58 includes a pair of upper and lower grooves or connection portions 66 and 68 for engaging swinging member 40. Grooves 66 and 68 run generally parallel to each other and generally parallel to base piece or track portion 52. Each of the grooves 66 and 68 is oblique and extends generally upwardly as it extends inwardly. Upper surface 60 abuts swinging member 40. Inner surface 62 is oblique and formed at an obtuse angle relative to base floor piece or track portion 52 for guiding the ski 12 back to the base floor piece or track portion 48 when the clamp 34 is open. Front surface 64 is oblique and formed at an obtuse angle relative to base floor piece or track portion 52 to push ski 12 up and over block 56 when the clamp 34 is open.

Clamping or swinging arm or member 40 generally includes a first end section 70 where the clamping member 34 is swingably engaged and which cooperates with base side section 50. Clamping member 40 further generally includes a second end section 72 where the clamping member 34 includes a quick connect and release connector 74 for cooperating with block 56.

Figure 6A:
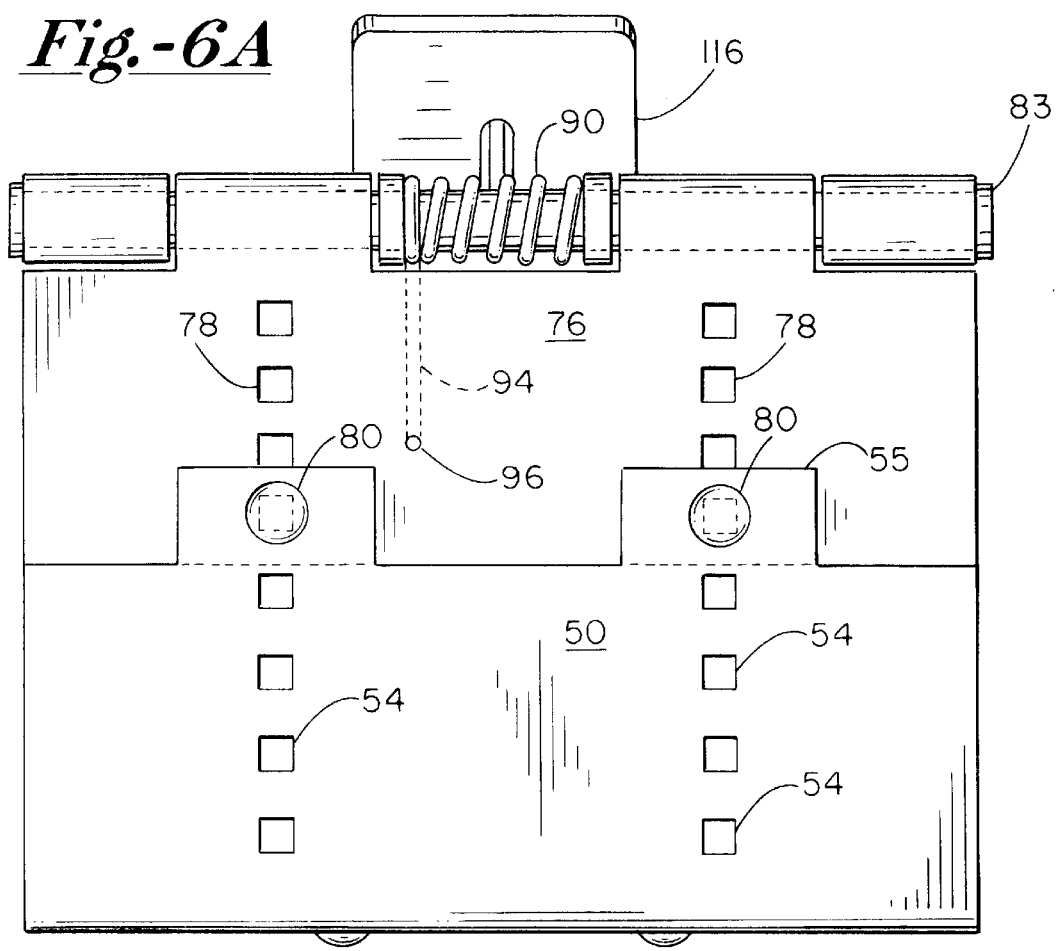
FIG. 6A is a side view of the clamp of FIG. 5A and indicates a relatively high adjustment for the snowmobile ski structure of FIG. 5A.
Figure 6B:
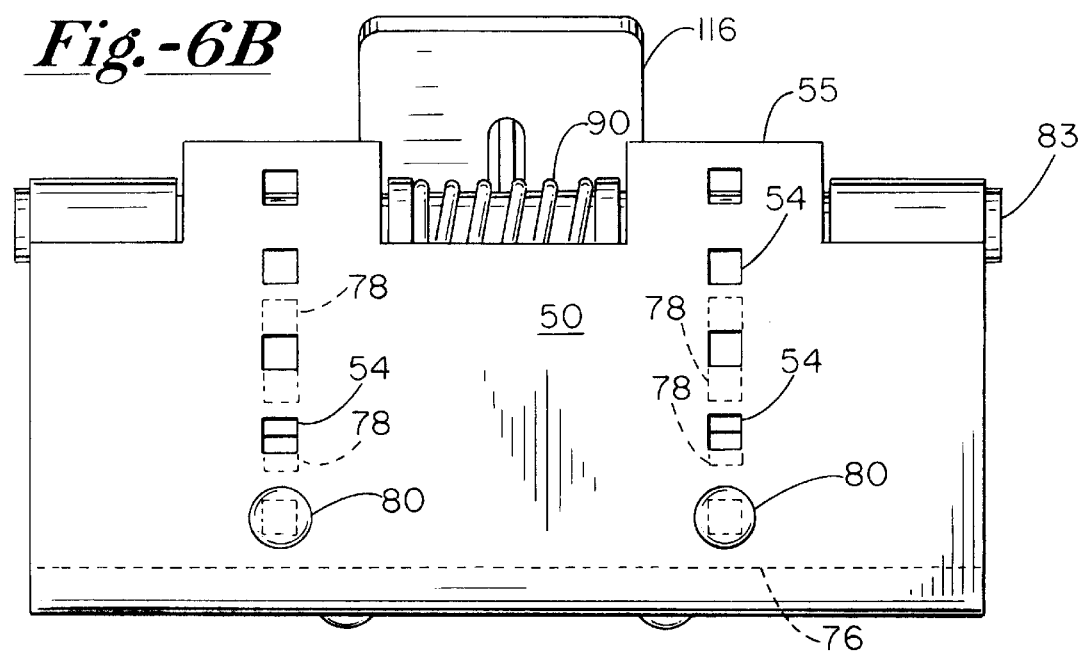
FIG. 6B is a side view of the clamp of FIG. 5B and indicates a relatively low adjustment for the snowmobile ski structure of FIG. 5B.
Figure 7A:
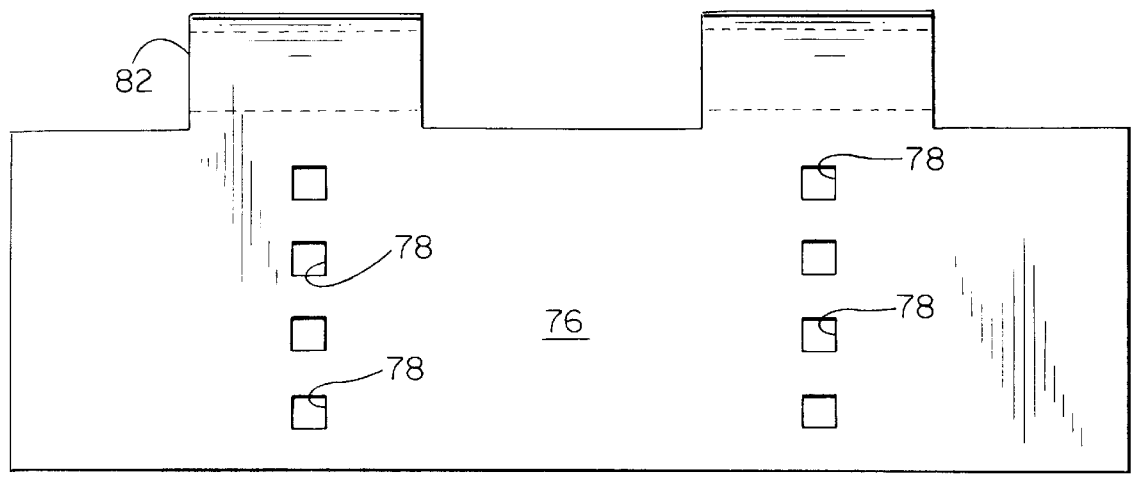
FIG. 7A is a plan view of one wall section for adjusting the height of the clamping member of the clamp of FIG. 2.
Figure 7B:
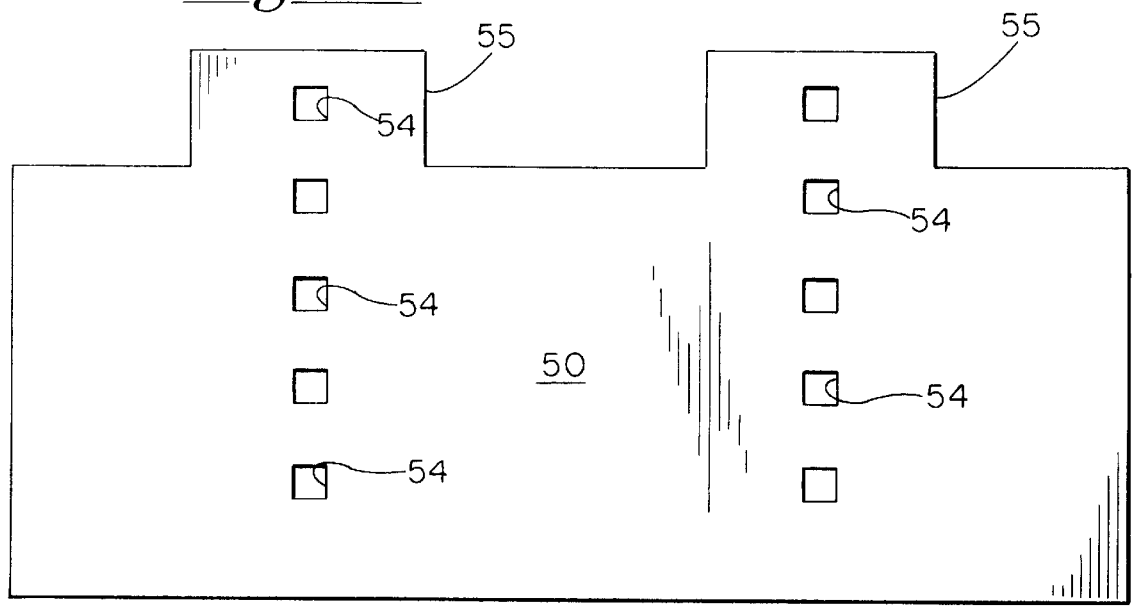
FIG. 7B is a plan view of another wall section cooperable with the wall section of FIG. 7A for adjusting the height of the clamping member of the clamp of FIG. 2.

First end section 70 of clamping member 34 includes a wall section 76 having a plurality of apertures 78, as shown in FIG. 7A. The apertures 78 are arranged similar their counterpart apertures 54 so as to align with apertures 54 and so as to permit pin connectors 80 to pass through aligned apertures 54, 78 so as to fix one pair of ends of base 38 and clamping member 40 at different heights relative to each other so as to customize clamp 34 for snowmobile skis having different structures. Such ends drawn apart to the maximum are shown in FIG. 6A. Such ends drawn together to the maximum are shown in FIG. 6B. As shown in FIGS. 6A and 6B, spacing between apertures 54 in one column may be greater than the spacing between apertures 78 in one column to provide for a fine tune adjustment.

Wall section 76 further includes a pair of integral plate extensions bent back and around to form integral hinge connections 82 for a hinge 83. When wall sections 50 and 76 are drawn together to the maximum, extension 55 of wall section 50 is generally aligned on two of its edges with the plate extension of wall section 76.

Clamping arm or member 40 includes an upper metal piece or first arm section 84 having integral hinge connections 86 for hinge 83. Hinge connections 86 mesh with hinge connections 82. Inwardly of a pair of inner hinge connections 86, and engaging hinge 83 is a coil 88 of a torsion spring 90. Torsion spring 90 further includes two ends with a first elongate end portion 92 abutting up against the inner surface of upper metal piece 84 and a second elongate end portion 94 abutting against the inner surface of wall section 76. Each of the elongate end portions 92, 94 includes a bent locating end 96 engaged in a hole or notch formed in its respective wall section 76 or metal piece 84. Torsion spring 90 biases the clamping arm 40 to the open and out of the way position shown in FIG. 3.

Upper metal piece 84 is tapered from end 70 to end 72 by a pair of tapering sides 98. Metal piece 84 includes a first integral plate portion 100 which preferably lies parallel to base piece 52 when the clamp 34 is closed and a second integral plate portion 102 which is disposed obliquely to plate portion 100 and which extends downwardly to block 56. Plate portion 102 includes a bottom face portion 104 which is parallel to upper surface 60 of block 56 when the clamp 34 is closed.

Figure 5A:
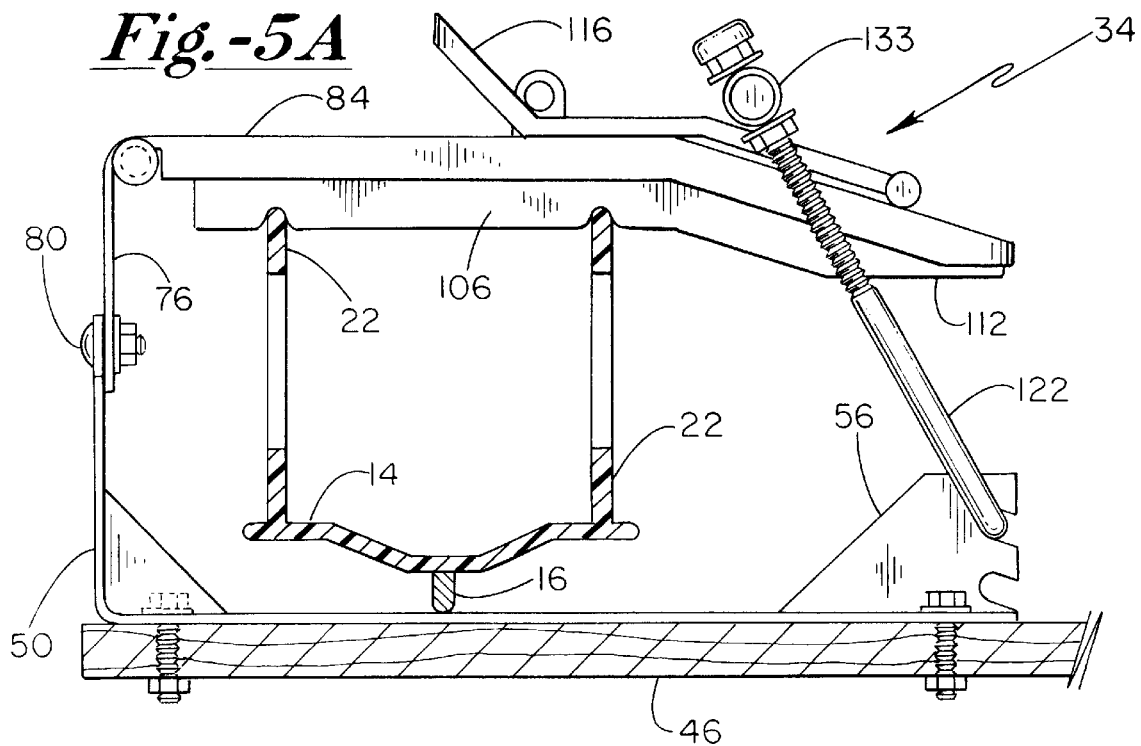
FIG. 5A is a front view of the clamp of FIG. 2 showing the clamp in its closed position and biting down on one type of snowmobile ski.
Figure 5B:
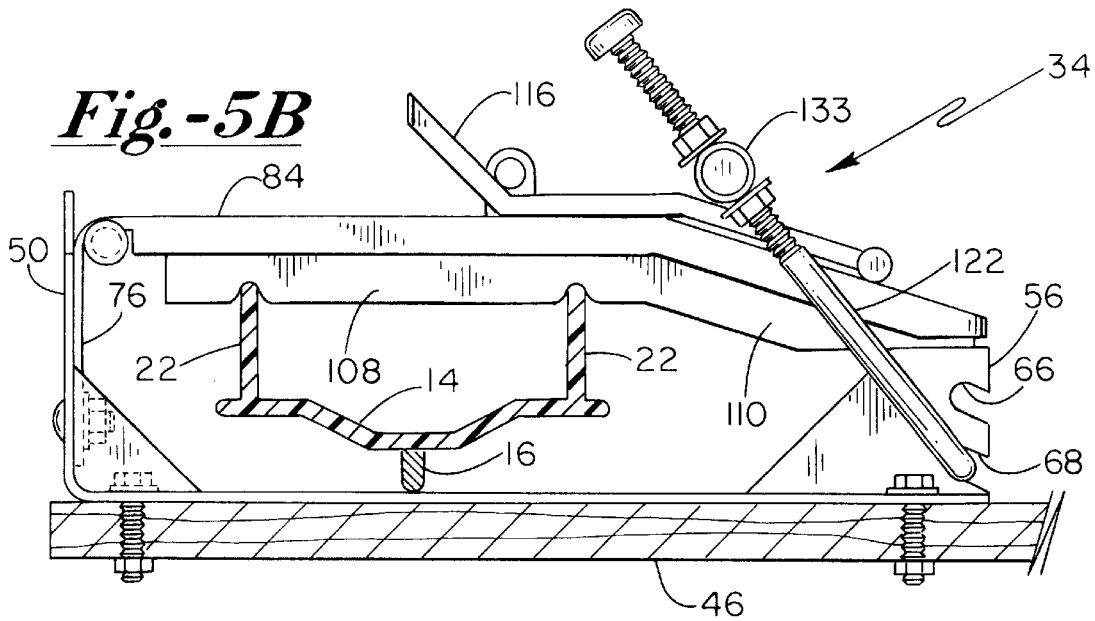
FIG. 5B is a front view of the clamp of FIG. 2 showing the clamp in its closed position and biting down on another type of snowmobile ski.

Clamping member 40 further includes a resilient but hard rubber isolator 106. Isolator 106 generally includes the same shape as upper metal piece 84 so as to be tapered and so as to include a first integral flat portion 108 and a second oblique flat portion 110. First flat portion 108 is generally parallel to base floor piece 52 when the clamp 34 is closed. Second oblique flat portion 110 includes a bottom face portion 112 which is parallel to and confronts upper surface 60 of block 56 when the clamp 34 is closed. Hard rubber isolator 106 is fixed to upper metal piece 84 via a set of pin connectors 114. As shown in FIGS. 5A and 5B, hard rubber isolator 106 bites into ribs 22 and spaces such ribs from upper metal piece 84.

Clamping member 40 further includes the quick connect and release connector 74. Connector 74 includes a rigid handle or second arm section 116 swingably fixed via hinge connection 118 to end 102 of clamping member 40. Handle 116 is welded to a U-bolt mechanism 120 and rotatable to a portion of the mechanism 120. Mechanism 120 includes a U-bolt or third arm section 122 having threaded rod portions 124 and a block engaging rod portion 126 and further includes a cross member 128 having apertures in either end to slidingly receive threaded rod portions 124. Cross member 128 includes a tube 129 which is welded via weld 130 to upper metal piece 84. Cross member 128 is adjustable incrementally on U-bolt 122 via a pair of threaded nuts 132 having lock washers confronting each of the ends of a cross pin 133 of cross member 128. Cross pin 133 extends through tube 129 and the ends of cross pin 133 include the apertures for U-bolt threaded rod portions 124. Cross pin 133 and tube 129 are relatively rotatable. By adjustment of nuts 132, the distance between second section or end 102 of clamping member 40 and grooves 66 and 68 of block 56 is adjustable. For example, FIG. 5A shows a maximum distance for a spacing apart of second section 102 of clamping member 40 and grooves 66 and 68 when the clamp 34 is closed and FIG. 5B shows a minimum distance for a spacing apart of second section 102 of clamping member 40 and grooves 66 and 68 of block 56.

Clamping member 40 further includes a locking mechanism having a tab 134 with an eyelet 136. Tab 134 is rigidly fixed to upper metal piece 84. This locking mechanism further includes a slot 138 in the handle 116 for receiving the tab 136. A padlock may engage eyelet 136 and confront the upper surface of handle 116 so as to lock clamp 34 in a closed position and to secure the snowmobile 10 against theft.

In operation, the clamp 34 is opened such that the clamping or swinging arm 40 is swung to the open and out of the way position shown in FIG. 3. The clamping arm 40 is biased toward the open and out of the way position via the torsion spring 90. The snowmobile 10 is then driven forwardly up a first ramp at one end of the trailer and into the trailer having a bed similar to bed 46. The snowmobile 10 is driven forwardly up to and partially over the clamp 34 such that the clamp 34 is positioned between the strut support 20 and the hook 18 and immediately in front of skag 16. As the snowmobile ski 12 rides over base 38, ski 12 may hit the block 56 and slide over the block 56 via front oblique surface 64 or be guided back into the clamp 34 via oblique side surface 62. Then the clamping arm 40 is swung down and the handle 116 is manipulated to engage rod portion 126 with one of the grooves 66 or 68. The handle 116 is then swung in the direction toward base wall section 50 and against metal piece portion 100. This swinging brings the mechanism 74 over center and effectively locks the clamping arm 40 to base 38. This swinging pivots rod portion 126 in its groove 66 or 68, swings U-bolt 122 relative to handle 116 via tube 129 and cross pin 133, and swings handle 116 relative to metal piece 84 via hinge connection 118. Such swinging further brings hard resilient piece 108 into a biting engagement with the ribs 22 of ski 12. The biting engagement is tight and locks the snowmobile ski 12 and snowmobile 10 against movement forwardly, rearwardly, upwardly, and sideways even if the force behind such movement is relatively great. Base 38 prevents movement downwardly such as through a wooden trailer bed. A second lock, such as against theft, is provided by engaging a padlock with tab 134.

During transport, as indicated, clamp 34 minimizes forwardly, rearwardly, upwardly, downwardly, and sideways movement of the ski 12 and its snowmobile 10 even for cross country trips and even in the event of sudden stops. It should be noted that upward pressure of ski 12 against hard resilient isolator 106 and metal portion 84 only serves to push end 72 upwardly and draw mechanism 74 further over center and thus lock clamp member 40 more tightly to block 56 and base 38. Rearwardly, frontwardly and sideways movement is minimized by the bite of the resilient isolator 106.

At the destination, a second ramp at another end of the trailer is let out. The padlock is removed from tab eyelet 136, the handle 116 is manipulated to draw the handle 116 in an upwardly direction away from flat portion 100 of metal piece 84 to draw the mechanism 74 back over center and to swing rod portion 126 out of engagement with its groove 66 or 68. Clamping arm 40 then swings back under pressure from torsion spring 90 to the open and out of the way position shown in FIG. 3 such as to a sidewall of a trailer or such as to the middle of the trailer. The snowmobile 10 is then driven forwardly to drive ski 12 through clamp 34 with skag 16 sliding on base floor piece 48. The snowmobile 10 is then driven forwardly off the trailer via the second ramp, in the same direction the snowmobile was driven onto the trailer.

Prior to operation of clamp 34, clamp 34 is adjusted to fit the particular snowmobile ski 12. For example, wall sections 50 and 76 are fixed relative to each other, and over center mechanism 74 is adjusted via nuts 132 to space end 72 relative to block 56. It is preferable to adjust the clamp 34 such that resilient portion 108 of isolator 106 is generally parallel to floor base portion 48 so that the resilient portion 108 brings pressure to bear equally on ribs 22.

It should be noted that the positioning of clamp 34 in a trailer may depend upon the type of trailer being used. For example, in a trailer large enough to accommodate only one snowmobile, clamp 34 is positioned at one of the sides of the trailer or sidewalls of the trailer if the trailer is enclosed. Or two clamps may be used, with each clamp 34 bolted to the floor at one of the sides or sidewalls of the trailer. In a trailer of sufficient size to accommodate two snowmobiles side by side and two clamps are used, one for each snowmobile, then each clamp may be positioned at one side or sidewall of the trailer to clamp opposing skis, or the clamps may be positioned back to back in the middle of the trailer to clamp adjacent skis. Or in such a two snowmobile trailer, four clamps may be used, two back to back in the middle of the trailer and one at each of the sides or sidewalls of the trailer.

In an alternate embodiment 148 of the invention, as shown in FIG. 8, swinging mechanism 74 is replaced by a crank mechanism 150 which draws end 72 incrementally towards and away from block 56. Crank mechanism 150 includes a crank 152 having a rotatable handle 154 at one end and a threaded portion 156 at the other end. Threaded end 156 engages a threaded receptor 158 formed in block 56. Between the ends, crank 152 extends through bushing 160 fixed on arm end 72, through a hole formed in arm end 72, and through a hole formed in a block like isolator 162 formed of a resilient material. Block like isolators 162 of different heights may be provided with clamp 148 to provide for the preferred height adjustment for a particular snowmobile ski 12. Isolators 106 and 162 are preferably hard rubber pieces. However, a relatively hard foam rubber may be used if desired.

As further indicated in FIG. 8, tracks 164 may be formed by fixing a set of elongate ribs 166 on the base floor portion 48. Tracks 164 guide the base or body 14 of ski 12 and further catch and guide skag 16.

It should be noted that FIG. 4 shows the over center mechanism 74 swung to one side of its center and that FIGS. 2, 5A, and 5B show the over center mechanism 74 swung completely to the other side of its center. FIG. 3 is a hybrid, with the handle 116 swung against metal piece 84 and the U-bolt 122 swung such that rod portion 126 is inwardly of end 72. It thus can be appreciated that rod portion 126 is swingable relative to handle 116 which in turn is swingable relative to metal piece 84, which in turn is swingable relative to base 38. It can further be appreciated that rod portion 126 pivots relative to its groove 66 or 68, and that U-bolt 122 swings relative to such groove 66 or 68. The axis of the pivoting of rod portion 126, the axis of rotation of tube 129 relative to pin 133, the axis of hinge connection 118, and the axis of hinge 83 are generally parallel to each other.

It should further be noted that with most snowmobile skis, the orientation shown in FIG. 5B is used where the wall sections 50 and 76 are drawn completely together. In such an orientation, nuts 132 are manipulated to position rod portion 126 such that when clamp 34 engages ski 12, upper groove 66 is used. When the trailer is driven without snowmobile 10 and clamp 34 is empty, clamp 34 is shut so that clamping arm 40 abuts block 56 and rod portion 126 engages lower groove 68 to minimize a bouncing of swing arm 40 when driving.

It should be noted that the durometer of the isolator 106 or 162 is preferably the durometer of the rubber of an automobile tire. Such a durometer is generally noncompressive when pinched between the thumb and finger, but is compressive under the weight of an object such as a car.

It should be noted that each of the ends of cross pin 133 is preferably formed of a tube portion having a diameter equal to the diameter of tube 129, with the cross pin in such case being inside such tube portion. The tube portions act as stops for tube 129. Tube portions are held from sliding transversely by U-bolt threaded rod portions 124.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalents of the claims are intended to be embraced therein.

I claim:

1. A snowmobile ski clamp for clamping one or more skis of a snowmobile to a trailer having a floor comprising, in combination:
    a) a base having a pair of spaced apart first and second portions, with the base being engagable to the floor of the trailer, with the first and second portions being spaced apart by a sufficient distance to permit at least one of the skis of the snowmobile to pass therebetween;
    b) a swinging member comprising a first arm section swingably engaged to the first portion of the base and a second arm section swingably and removably engaged to the second portion of the base, wherein the swinging member includes a first closed position where the second arm section is engaged to the second portion of the base with at least one ski of the snowmobile being clamped between the base and the swinging member, and wherein the swinging member includes a second open position where the swinging member is swung to an out of the way position when the second arm section is disengaged from the second portion of the base whereby the snowmobile may be driven in one direction up to and on the base such as prior to transport, clamped to the clamp during transport, and then driven off the base in the same direction when the swinging member is again swung to the out of the way position; and
    c) wherein the swinging member further comprises a third arm section, with the third arm section being engaged between the first and second arm sections and with the third arm section being swingably engaged to each of the first and second arm sections whereby the third arm section draws the first and second arm sections towards and away from each other so as to tighten and loosen the clamp.

2. The snowmobile ski clamp according to claim 1 wherein the third arm section of the swinging member draws parts of the first and second arm sections into a confronting position in the first closed position such that outward pressure exerted by a snowmobile ski clamped therein draws the first and second arm sections even more tightly together to provide an over center mechanism.

3. The snowmobile ski clamp according to claim 1 in combination with a track for guiding a snowmobile ski.

4. The snowmobile ski clamp according to claim 1 and further comprising a quick connect and release connection between the second arm section of the swinging member and the second portion of the base.

5. The snowmobile ski clamp according to claim 4 wherein the quick connect and release connection includes a first connection portion and a second connection portion, with the connection portions being disposed at different heights relative to the base such that the swinging member is quickly adjustable to different heights relative to the base.

6. The snowmobile ski clamp according to claim 1 wherein one of the second portion of the base and second arm section of the swinging member includes an incrementally adjustable connector that is incrementally adjustable towards and away from the other of the second portion of the base and second arm section of the swinging member whereby the clamp may be customized for skis having different structures.

7. The snowmobile ski clamp according to claim 1 wherein the first portion of the base and first arm section of the swinging member are adjustable to and away from each other whereby the clamp may be customized for skis having different structures.

8. A snowmobile ski clamp for clamping one or more skis of a snowmobile to a trailer having a floor comprising in combination:

a) a base having a pair of spaced apart first and second portions with the base being engagable to the floor of the trailer with the first and second portions being spaced apart by a sufficient distance to permit at least one of the skis of the snowmobile to pass therebetween;

b) a swinging member comprising a first section swingably engaged to the first portion of the base and a second section swingably and removably engaged to the second portion of the base, wherein the swinging member includes a first closed position where the second section is engaged to the second portion of the base with at least one ski of the snowmobile being clamped between the base and the swinging member and wherein the swinging member includes a second open position where the swinging member is swung to an out of the way position when the second section is disengaged from the second portion of the base whereby the snowmobile may be driven in one direction up to and on the base such as prior to transport, clamped to the clamp during transport and then driven off the base in the same direction when the swinging member is again swung to the out of the way position; and wherein the first portion of the base and first section of the swinging member are adjustable to and away from each other and wherein the second portion of the base and the second section of the swinging member are adjustable to and away from each other whereby the clamp may be customized for skis having different structures.

9. The snowmobile ski clamp according to claim 1 wherein the swinging member comprises a resilient piece that confronts said at least one ski to maximize engagement between said at least one ski and the clamp and minimize damage to said at least one ski.

10. The snowmobile ski clamp according to claim 9 wherein the resilient piece has a hardness sufficient to be generally noncompressive when squeezed between the thumb and one finger.

11. The snowmobile ski clamp according to claim 1 wherein the swinging member is biased, via a spring engaged to and between the swinging member and the first portion of the base, to the out of the way position where the snowmobile may be driven in one direction up to and on the base and driven off the base in the same direction.

12. The snowmobile ski clamp according to claim 1 wherein the second portion of the base comprises a block to which the second arm section of the swinging member is engagable, and wherein the base includes a floor portion that confronts said at least one ski, with the block extending from the floor portion of the base and comprising an oblique side surface that generally faces the swinging member and that forms an obtuse angle with the floor portion of the base to guide said at least one ski back towards the base when said at least one ski passes over the base.

13. The snowmobile ski clamp according to claim 1 wherein the second portion of the base comprises a block to which the second arm section of the swinging member is engagable, and wherein the base includes a floor portion that confronts said at least one ski, with the block extending from the floor portion of the base and comprising an oblique side surface that generally faces a direction which is transverse of a direction between the first and second portions of the base and that forms an obtuse angle with the floor portion of the base to guide said at least one ski in a direction over the block instead of into the block.

14. The snowmobile ski clamp according to claim 1 wherein the swinging member and base are lockable together when the second arm section of the swinging member is engaged to the second portion of the base.

15. The snowmobile ski clamp according to claim 1 wherein the base comprises a floor portion between the first and second portion, with the floor portion comprising a set of elongate tracks, with each of the tracks extending in a direction transversely of a direction between the first and second portions whereby one of the tracks may guide a skag of a ski.

16. A snowmobile ski clamp for clamping one or more skis of a snowmobile to a trailer having a floor comprising, in combination:

a) a base having a pair of spaced apart first and second portions, with the base comprising a rigid plate extending to and between the first and second portions with the rigid plate confronting the floor of the trailer and further confronting the snowmobile ski when the snowmobile ski is clamped in the clamp, with the base being engagable to the floor of the trailer, with the first and second portions being spaced apart by a sufficient distance to permit at least one of the skis of the snowmobile to pass therebetween;

b) a swinging member comprising a first section swingably engaged to the first portion of the base and a second section removably engaged to the second portion of the base, wherein the swinging member includes a first closed position where the second section is engaged to the second portion of the base with at least one ski of the snowmobile being clamped therebetween, and wherein the swinging member includes a second open position where the swinging member is swung to an out of the way position when the second section is disengaged from the second portion of the base whereby the snowmobile may be driven in one direction up to and on the base such as prior to transport, clamped to the clamp during transport, and then driven off the base in the same direction when the swinging member is again swung to the out of the way positions c) wherein the first section of the swinging member engages the snowmobile ski and comprises a rigid section and a resilient section, with the resilient section confronting the snowmobile ski, with each of the rigid and resilient sections extending over a width of the snowmobile ski such that the snowmobile ski is clamped between the rigid plate of the base and the resilient section of the first section of the swinging member;

d) a biasing member between the first section of the swinging member and the first portion of the base such that the swinging member is biased to the out of the way position such that the snowmobile may be driven in one direction up to and on the plate and then driven off the plate in the same direction; and e) wherein the first section of the swinging member when in the out of way position has swung sufficiently away from the plate of the base to open the clamp in an upward direction from the first portion of the base to the second portion of the base so that a snowmobile may be driven in one direction up to and on the base and then driven off the base in the same direction.

17. The snowmobile ski clamp according to claim 16 wherein the second portion of the base comprises an oblique side surface that generally faces the first section of the swinging member and that forms an obtuse angle with the plate to guide a snowmobile ski back towards the plate when said snowmobile ski passes over the oblique side surface.

18. The snowmobile ski clamp according to claim 16 wherein the second portion of the base comprises an oblique side surface that generally faces a direction which is transverse of a direction between the first and second portions of the base and that forms an obtuse angle with the plate to guide a snowmobile ski over the second portion of the base instead of into the second portion of the base.

19. A snowmobile ski clamp for clamping one or more skis of a snowmobile to a trailer having a floor comprising, in combination:

a) a base having a pair of spaced apart first and second portions, with the base being engagable to the floor of the trailer, with the first and second portions being spaced apart by a sufficient distance to permit at least one of the skis of the snowmobile to pass therebetween;

b) a clamping member comprising a first section engaged to the first portion of the base and a second section removably engaged to the second portion of the base, wherein the clamping member includes a first closed position where the second section is engaged to the second portion of the base with at least one ski of the snowmobile being clamped therebetween, and wherein the clamping member includes a second open position where the clamping member is moved to an out of the way position when the second section is disengaged from the second portion of the base whereby the snowmobile may be driven in one direction up to and on the base such as prior to transport, clamped to the clamp during transport, and then driven off the base in the same direction when the clamping member is again moved to the out of the way position;

c) a resilient piece on the clamping member and facing the base so as to confront said at least one ski;

d) a quick connect and release connection between the second section of the clamping member and the second portion of the base for quickly connecting and quickly releasing said at least one ski; and e) wherein the first portion of the base and first section of the clamping member are adjustable towards and away from each other to customize the clamp for skis having different structures; and wherein the second portion of the base and the second section of the clamping member are adjustable towards and away from each other to customize the clamp for skis having different structures.

20. The snowmobile ski clamp according to claim 19 wherein the clamping member is pivotally engaged to the first portion of the base whereby the second section of the clamping member swings to and away from the second portion of the base and wherein the quick connect and release connection includes a pivotal engagement between the second section of the clamping member and the second portion of the base.

21. A snowmobile ski clamp for clamping one or more skis of a snowmobile to a trailer having a floor comprising, in combination:

a) a base having a pair of spaced apart first and second portions, with the base comprising a rigid plate extending to and between the first and second portions, with the rigid plate confronting the floor of the trailer and further confronting the snowmobile ski when the snowmobile ski is clamped in the clamp, with the base being engagable to the floor of the trailer, with the first and second portions being spaced apart by a sufficient distance to permit at least one of the skis of the snowmobile to pass therebetween;

b) a swinging member comprising a first section swingably engaged to the first portion of the base and a second section removably engaged to the second portion of the base, wherein the swinging member includes a first closed position where the second section is engaged to the second portion of the base with at least one ski of the snowmobile being clamped therebetween, and wherein the swinging member includes a second open position where the swinging member is swung to an out of the way position when the second section is disengaged from the second portion of the base whereby the snowmobile may be driven in one direction up to and on the base such as prior to transport, clamped to the clamp during transport, and then driven off the base in the same direction when the swinging member is again swung to the out of the way position;

c) wherein the first section of the swinging member engages the snowmobile ski and comprises a rigid section and a resilient section, with the resilient section confronting the snowmobile ski, with the snowmobile ski being clamped between the rigid plate of the base and the resilient section of the first section of the swinging member;

d) wherein the first section of the swinging member when in the out of way position has swung sufficiently away from the plate of the base to open the clamp in an upward direction from the first portion of the base to the second portion of the base so that a snowmobile may be driven in one direction up to and on the base and then driven off the base in the same direction; and e) the swinging member further comprising a third section engaged to and between the first and second sections, with the third section drawing the first and second sections to and away from each other to tighten and loosen the clamp.

22. A method for clamping a snowmobile to a trailer with a clamp, with the snowmobile having a snowmobile ski, with the trailer having a floor to which the clamp is engaged, with the clamp comprising:

a) a base having a pair of spaced apart first and second portions, with the base being engagable to the floor of the trailer, with the first and second portions being spaced apart by a sufficient distance to permit at least one of the skis of the snowmobile to pass therebetween;

b) a swinging member comprising a first section swingably engaged to the first portion of the base and a second section removably engaged to the second portion of the base, wherein the swinging member includes a first closed position where the second section is engaged to the second portion of the base with at least one ski of the snowmobile being clamped therebetween, and wherein the swinging member includes a second open position where the swinging member is swung to an out of the way position when the second section is disengaged from the second portion of the base whereby the snowmobile may be driven in one direction up to and on the base such as prior to transport, clamped to the clamp during transport, and then driven off the base in the same direction when the swinging member is again swung to the out of the way position;

c) wherein the first section of the swinging member engages a ski of the snowmobile and comprises a rigid section and a resilient section, with the resilient section confronting the snowmobile ski;

d) wherein the first section of the swinging member when in the out of the way position has swung sufficiently away from the base to open the clamp in an upward direction from the first portion of the base to the second portion of the base so that a snowmobile may be driven in one direction up to and on the base and then driven off the base in the same direction; and wherein the method comprises the steps of:

i) swinging the swinging member to the out of the way position; then ii) driving the snowmobile in a first direction into the clamp such that a ski of the snowmobile is between the first and second portions of the base; then iii) swinging the swinging member to the closed position; then iv) transporting the snowmobile in the trailer; then v) swinging the swinging member to the out of the way position; and then vi) driving the snowmobile out of the clamp.

23. The method of claim 22 wherein the step of driving the snowmobile out of the clamp comprises the step of driving the snowmobile in the first direction out of the clamp.

* * * * *